United States Patent
Back

[11] 4,009,928
[45] Mar. 1, 1977

[54] THREE ELEMENT VARIFOCAL LENS SYSTEMS

[76] Inventor: Frank G. Back, 55 Sea Cliff Ave., Glen Cove, N.Y. 11560

[22] Filed: June 27, 1975

[21] Appl. No.: 590,805

[52] U.S. Cl. .................................. 350/2; 350/184; 350/225

[51] Int. Cl.² .............................. G02B 15/14

[58] Field of Search ............. 350/184, 2, 225

[56] References Cited

UNITED STATES PATENTS

| 696,788 | 4/1902 | Allen | 350/225 |
| 3,597,048 | 8/1971 | Bertele | 350/184 |
| 3,825,315 | 7/1974 | Altman et al. | 350/2 |

*Primary Examiner*—John K. Corbin
*Assistant Examiner*—Conrad Clark
*Attorney, Agent, or Firm*—Albert F. Kronman

[57] ABSTRACT

A three element varifocal lens system in which the front and back lens elements are stationary and the inner lens is shiftable from the telephoto to the wide angle position. The front lens is negative while the inner and back lenses are positive. The lens system has particular utility for infrared imaging systems.

1 Claim, 3 Drawing Figures

THREE ELEMENT VARIFOCAL LENS SYSTEMS

BACKGROUND OF THE INVENTION

While early work on varifocal lens systems referred to three and even two element optically compensated systems, subsequent varifocal lens systems have become increasingly complex involving large groups of lenses. Prior art optically compensated three element varifocal lens systems, moreover, consisted of a front lens coupled to a back lens and a fixed center lens. The front and back lenses were both negative or positive lenses and were longitudinally shiftable along the optical axis of the system from the wide angle to the telephoto position. Where the front and back lenses were positive the fixed center lens was negative. Where front and back lenses were negative the center lens was positive; F. G. Back and H. Lowen, *Journal of the Optical Society of America*, Vol. 44, No. 9, pp. 684–691, September, 1954; F. G. Back and H. Lowen, *Journal of the Optical Society of America*, Vol. 48, No. 3, pp. 149–153, March, 1958; T. H. Jamieson, *Optical Acta*, England, Vol. 18, No. 1, pp. 17–30, 1971.

In the varifocal lens system of the present invention the front and back lenses are substantially fixed while the inner lens is axially shiftable to change from the wide angle to the telephoto position. Moreover, the front lens is a negative lens while the back lens and inner lens are positive. Such a lens system provides advantages in improved light transmission, compact size, light weight, large back focal length and is more trouble free is its operation as hereinafter more fully set forth.

DESCRIPTION OF THE DRAWINGS

In the accompanying drawings forming part hereof similar parts have been given the same reference numerals, in which drawings.

GENERAL DESCRIPTION

Figure 1:
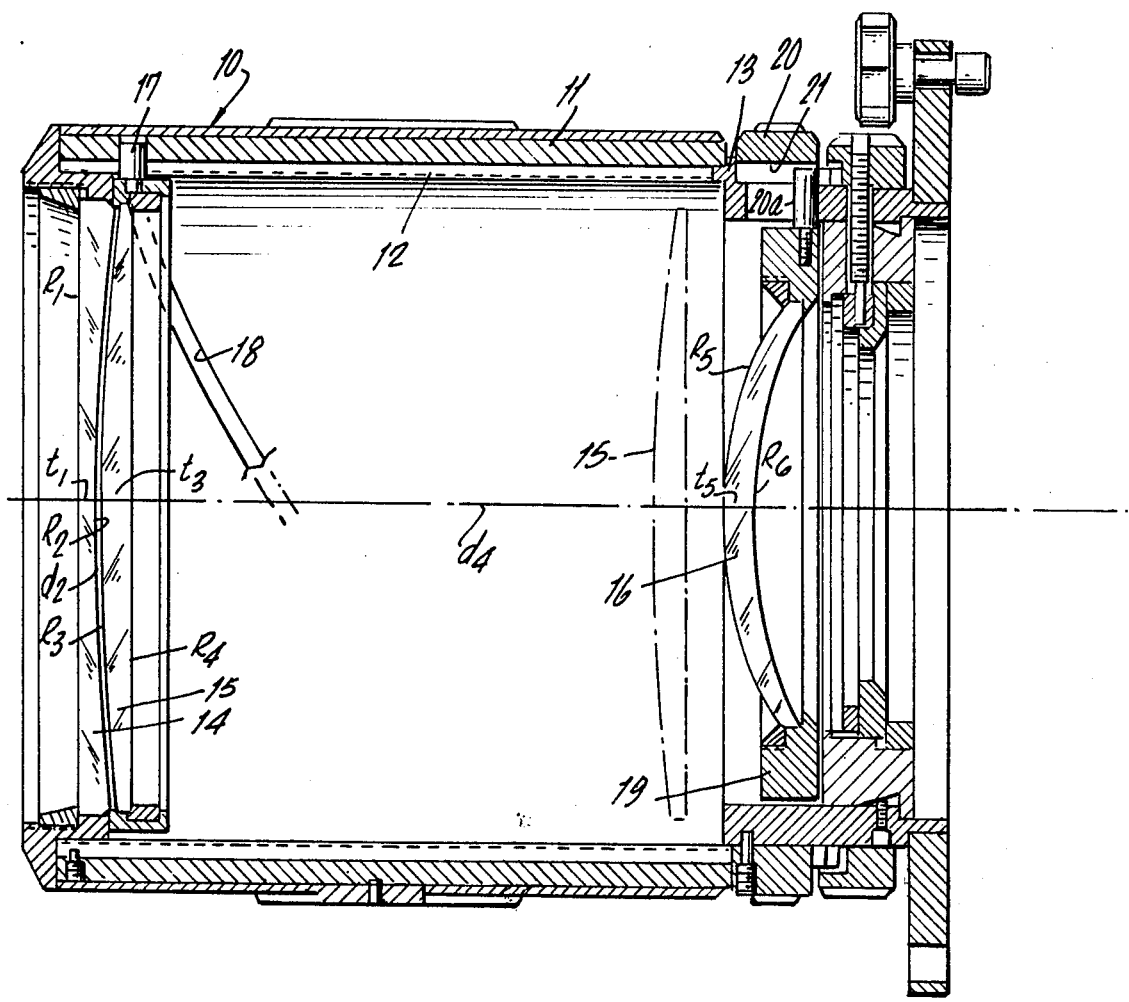
FIG. 1 is a view in vertical section of a complete embodiment of a variable focal length lens made in accordance with the present invention.

Referring to the drawings, 10 indicates a three element varifocal lens assembly made in accordance with the present invention. An outer barrel 11 is journaled upon an inner barrel 12 which is secured to a mount 13.

A three element lens system consisting of a negative stationary front lens 14, a longitudinally shiftable positive inner lens element 15 and a stationary positive back element 16 are carried within the inner barrel 12 and mount 13. The lens elements 14, 15, 16 are made of glass or if the lens system is to be used in an infrared imaging apparatus some material suitable for IR transmission such as germanium.

Figure 2:
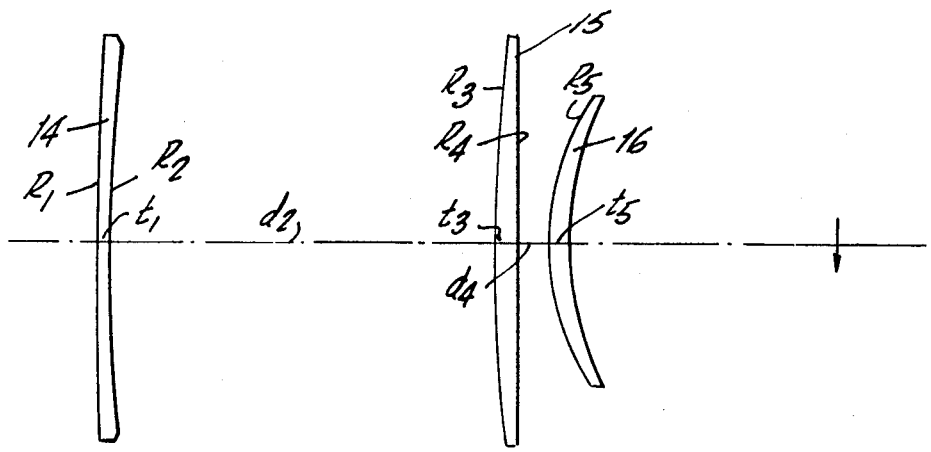
FIG. 2 is a diagrammatic cross sectional view of the lens system shown in FIG. 1, in the wide angle position.
Figure 3:
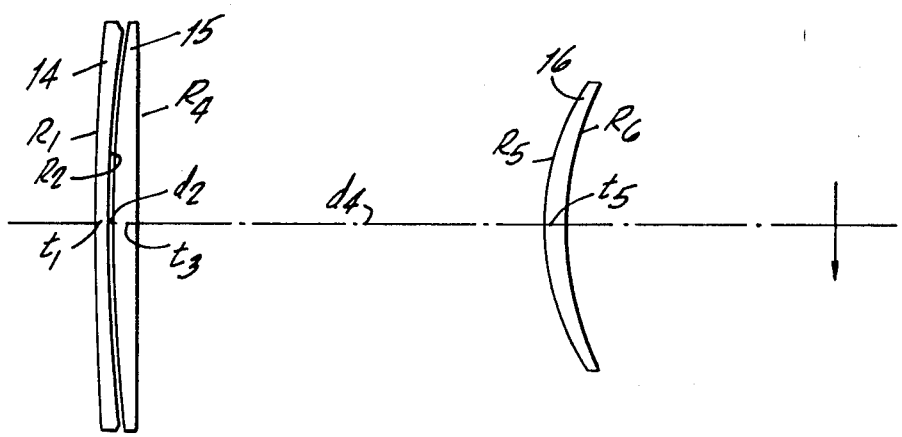
FIG. 3 is a view similar to FIG. 2, in the telephoto position.

The inner lens 15 is coupled to the outer barrel 11 by a pin 17 which extends through a helical slot 18 cut through the wall of the inner barrel 12. As the outer barrel is rotated, the inner lens 15 is thus caused to shift between the position shown in FIG. 1 (adjacent the back lens) and that shown in FIG. 2 (adjacent the front lens) or between the wide angle and telephoto positions.

The rear lens is carried within a ring 19 which is coupled to a fine focusing barrel 20 by a pin 20a for the purpose of correcting residual first order abberations when necessary. The pin 2 may be shifted within the slot 21 in the mount 13 by any means well-known in the art such as a cam or hand movement of the barrel 20.

The following tables give the optical characteristics of the lens assembly shown in the drawings:

TABLE I

| Lens No. | (Wide Angle) Radius R in mm | Thickness (t) Spacing (d) in mm |
|---|---|---|
| 14 | $R_1 = 1504.24$ | $t_1 = 5$ |
|  | $R_2 = -476.17$ | $d_2 = 102.0$ |
| 15 | $R_3 = 476.17$ | $t_3 = 7$ |
|  | $R_4 = 3159.56$ | $d_4 = 5$ |
| 16 | $R_5 = 63.13$ | $t_5 = 5$ |
|  | $R_6 = -75.72$ |  |

EFL = 48.17
BFL = 65.92
Material-Germanium-Refractive Index 4.003

TABLE II

| Lens No. | Telephoto Radius R in mm | Thickness (t) Spacing (d) in mm |
|---|---|---|
| 14 | $R_1 = 1504.24$ | $t_1 = 5$ |
|  | $R_2 = -476.17$ | $d_2 = 2.35$ |
| 15 | $R_3 = 476.17$ | $d_3 = 7$ |
|  | $R_4 = 3159.56$ | $d_4 = 104.65$ |
| 16 | $R_5 = 63.13$ | $t_5 = 5$ |
|  | $R_6 = -75.72$ |  |

EFL = 97.725
BFL = 65.92
Material-Germanium-Refractive Index 4.003

The present, above disclosed variable focal lens system is ideally suited for use in connection with infrared imaging systems since it avoids one of the shortcomings of previously known zoom lenses which contain a large number of lens elements since in the infrared region of over 3 $\mu$ the most commonly used lens material is germanium. Germanium has a high refractive index and, at certain wave lengths, appreciable absorption because of the inhomogenity of the metaloid semiconductors. Even where multi-layer, anti-reflection coatings are employed on the germanium elements, the lens systems are not satisfactory. In addition, the speed of the variable focal lens assembly must have a high $f$ number of $f/1$ or better. This requirement is due to the low IR energy levels suitable in infrared work and the limitations of presently known equipment for converting the energy into an image.

Most of the IR systems require lenses with a long back focal length. Thus, while three element zoom lenses are well known, as for example, those disclosed in the above recited publications, such prior art varifocal lens systems are not satisfactory for use with infrared equipment.

From the foregoing, it will be seen that there has been provided a varifocal lens system containing a minimum number of lens elements which will greatly improve light transmission as compared with prior art devices. The lens system has a large back focal length which makes it possible to use an orbiter or a scanning mirror commonly required in infrared systems.

Because only one element is moved, the lens system is compact and more trouble-free in its construction. Moreover, there has been provided a varifocal lens system of sufficiently high speed to compensate for the low energy levels commonly encountered in IR systems.

Having thus fully described the invention, what is claimed as new and desired to be secured by Letters Patent of the United States is:

1. A long back focal length varifocal lens system comprising three air spaced lens elements disposed along the optical axis of the system formed of a material having a high infrared wave length transmission comprising in the order of the entrant light beam, a stationary negative front lens, a longitudinally movable positive inner lens element and a stationary positive back lens element in which the lens system has the following optical characteristics:

| Lens No. | Radius R in mm | Thickness (t) Spacing (d) in mm (Wide Angle) | (Telephoto) |
|---|---|---|---|
| 14 | $R_1 = 1504.24$ | $t_1 = 5$ | $t_1 = 5$ |
|  | $R_2 = -476.17$ | $d_2 = 102.0$ | $d_2 = 2.35$ |
| 15 | $R_3 = 476.17$ |  |  |
|  | $R_4 = 3159.56$ | $t_3 = 7$ | $t_3 = 7$ |
|  | $R_5 = 63.13$ | $d_4 = 5$ | $d_4 = 104.65$ |
| 16 |  | $t_5 = 5$ | $t_5 = 5$ |
|  | $R_6 = -75.72$ |  |  |
|  |  | EFL = 48.17 | EFL = 97.725 |
|  |  | BFL = 65.92 | BFL = 65.92 |

Material-Germanium-Refractive Index 4.003

* * * * *